United States Patent [19]

Suzuki et al.

[11] Patent Number: 4,609,590
[45] Date of Patent: Sep. 2, 1986

[54] METHOD OF MAKING A COATED QUARTZ OPTICAL COMMUNICATIONS FIBER AND THE COATED FIBER OBTAINED THEREFROM

[75] Inventors: Toshio Suzuki; Kimio Yamakawa, both of Ichihara, Japan

[73] Assignee: Toray Silicone Company, Ltd., Tokyo, Japan

[21] Appl. No.: 735,230

[22] Filed: May 17, 1985

[30] Foreign Application Priority Data

May 31, 1984 [JP] Japan .................. 59-112630

[51] Int. Cl.$^4$ .................. D02G 3/00; B05D 5/06
[52] U.S. Cl. .................. 428/378; 65/3.41; 350/96.33; 427/163; 427/164; 427/387; 427/407.1; 428/387; 428/389; 428/391
[58] Field of Search ........... 427/163, 164, 387, 407.1, 427/407.3, 407.2; 428/378, 387, 389, 391; 350/96.33; 65/3.41

[56] References Cited

FOREIGN PATENT DOCUMENTS

| 54-47667 | 4/1979 | Japan | 427/163 |
| 60-46512 | 3/1985 | Japan | 427/163 |
| 60-46952 | 3/1985 | Japan | 427/163 |
| 60-46953 | 3/1985 | Japan | 427/163 |

OTHER PUBLICATIONS

Electronics Letters, pp. 1006–1008, 11/10/83, vol. 19, No. 23.
Lecture No. 1126 from the General National Meeting of the Institute of Electronics & Communication Engineers of Japan, 1984.

*Primary Examiner*—Thurman K. Page
*Attorney, Agent, or Firm*—Roger H. Borrousch

[57] ABSTRACT

Optical communications fibers made by coating with an addition curable composition made from an alkenyl containing organopolysiloxane, a methylhydrogenpolysiloxane, a platinum-type catalyst, and an alkynyl compound provide reduced hydrogen gas generation on quartz fiber and has less transmission loss when the platinum-type catalyst is present in amounts greater than 20 ppm platinum-type metal, the SiH to aliphatically unsaturated is from 0.75/1.00 to 1.05/1.00, and the weight ratio of total alkynyl groups to platinum-type metal is 1.0/1.0 to 15.0/1.00.

10 Claims, No Drawings

METHOD OF MAKING A COATED QUARTZ OPTICAL COMMUNICATIONS FIBER AND THE COATED FIBER OBTAINED THEREFROM

BACKGROUND OF THE INVENTION

1. Field of the Invention

This invention relates to a method of making coated quartz optical communications fibers and the coated fibers.

2. Background Information

Quartz optical communications fibers whose principal components are quartz in both the core and cladding and which contain extremely small amounts of refractive index regulators such as germanium, phosphorus, etc., offer the advantages of small diameter, heat resistance, weather resistance, flexibility, low loss, and high transmission capacity. As a result, they are widely used as communication media such as for public communications, long-distance communications, etc. In addition, the surfaces of quartz optical communications fibers are generally coated with a first coat in order to maintain the strength, for stress relaxation, and to prevent microbending by external forces. It is then coated with a final coat. The interior side of the first coat consists of a primary coat, for example, of urethane or phenylsilicone, which a large refractive index.

For the first coat, the prior art employs an addition-curable silicone composition in which a lower alkenyl group-containing organopolysiloxane is addition reacted with an organopolysiloxane possessing silicon-bonded hydrogen in the presence of a platinum-type catalyst. However, the use of such a curable silicone composition as a coating suffers from the drawback that said composition degrades the optical transmission properties of the above-mentioned fibers. As described in Electron Lett. 19, 1983 and Lecture Note No. 1126 from the 1984 General National Meeting of the Institute of Electronics and Communication Engineers of Japan (IECE Japan), this phenomenon is believed to be caused by a reaction between the hydrogen gas generated during curing of the addition-curable silicone composition and the germanium present in a quartz optical communications fibers in extremely small amounts as a refractive index regulator. Hydroxyl groups are thus formed which absorb light in the infrared region and the optical transmission properties are thus degraded.

SUMMARY OF THE INVENTION

Various methods were examined by the present inventors to resolve the drawbacks described above and this invention was thus developed as a result. That is, the goal of the present invention is to provide a method of coating quartz optical communications fibers with an addition-curable silicone composition which reduces the generation of hydrogen gas during curing to almost zero.

This invention relates to a method of suppressing hydrogen gas generation in making a coated quartz optical communications fiber comprising coating a quartz optical communications fiber with a composition consisting essentially of (a) organopolysiloxane with the average unit formula $R_a SiO_{(4-a)/2}$ in which R is a monovalent organic radical and at least 95 mol % of R in (a) are methyl radicals and a is a number with a value of 1.8 to 2.2, said organopolysiloxane having molecular terminals of the general formula

in which n is 0 or 1 (b) methylhydrogenpolysiloxane which has at least two silicon-bonded hydrogen atoms per molecule and whose average unit formula is $R_b^1 SiO_{(4-b)/2}$ in which $R^1$ is methyl radical or hydrogen atom and b is a number with a value of 1.5 to 3.0; (a) and (b) being present in sufficient amounts such that the molar ratio of the total moles of silicon-bonded hydrogen atoms in (b) to total moles of aliphatically unsaturated groups in the composition is from 0.75/1.00 to 1.05/1.00, (c) a platinum-type catalyst wherein at least 20 ppm platinum-type metal is present based on the combined quantities of (a) and (b), and (d) an alkynyl compound having at least one alkynyl group per molecule wherein the weight ratio of total alkynyl groups to platinum-type metal in the composition is 1.0/1.0 to 15.0/1.0, heating the resulting coated fiber curing the composition.

DETAILED DESCRIPTION OF THE INVENTION

Quartz optical communications fibers are coated by conventional techniques with the defined compositions and then cured by heating to produce coated fibers which exhibit improved properties because the generation of hydrogen gas is reduced to almost zero. The method of this invention in suppressing the hydrogen gas generation is dependent upon the selection of the composition which is used as the primary and first coat.

The compositions useful in the method of the invention consist essentially of (a) organopolysiloxane containing alkenyl groups, (b) methylhydrogenpolysiloxane, (c) a platinum-type catalyst, and (d) an alkynyl compound.

Component (a) is an organopolysiloxane with the average unit formula $R_a SiO_{(4-a)/2}$ whose molecular terminals have the general formula

R in the preceding formula is a monovalent organic group and examples thereof are alkyl groups such as methyl, ethyl, and propyl; alkenyl groups such as vinyl and allyl, and aryl groups such as phenyl, tolyl, and xylyl. At least 95% and preferably equal to or greater than 97% of R groups are methyl. An extremely small amount of silicon-bonded hydroxyl groups may be present in this organopolysiloxane. n is 0 or 1 and a is a number with a value of 1.8 to 2.2 and preferably 1.95 to 2.05. The (a) may be straight chain, branched chain, or network; however, it preferably has a straight chain configuration which contains small amounts of branching. The viscosity of the component is not critical; however, it is preferably 0.0001 to 0.02 $m^2/s$ at 25° C. from a consideration of the coating operation.

Examples of component (a) are

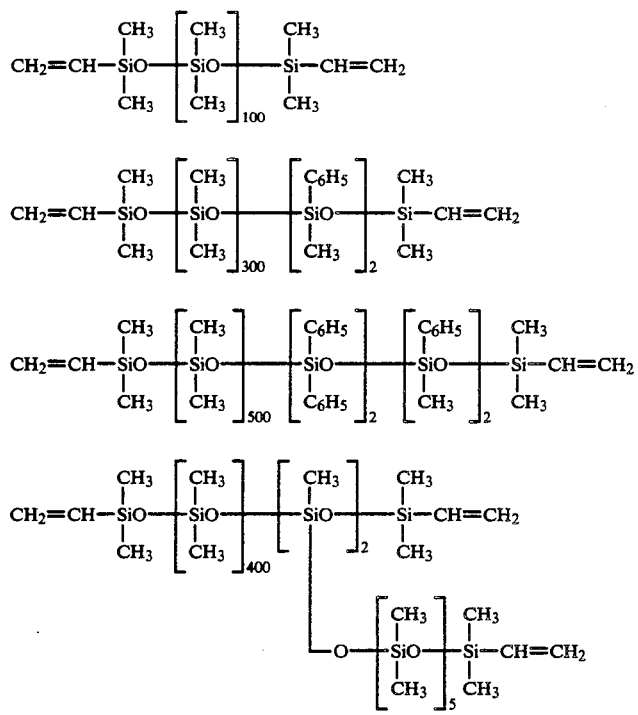

and these organopolysiloxanes in which the vinyl group is replaced by the allyl group.

Component (b) is the component which addition reacts with component (a) in the presence of the catalyst, component (c), to produce a crosslinked structure. (b) is a methylhydrogenpolysiloxane possessing at least two silicon-bonded hydrogen atoms per molecule and whose average unit formula is

$R^1$ in this formula is the methyl group or a hydrogen atom and b is a number with a value of 1.5 to 3.0. The structure of this component is not critical and it may be straight chain, branched chain, or network. The viscosity of this component is not critical; however, the viscosity is preferably $1 \times 10^{-7}$ to 0.01 m²/s at 25° C. Examples of component (b) are trimethylsilyl terminated dimethylsiloxane-methylhydrogensiloxane copolymer, dimethylhydrogensilyl terminated dimethylsiloxane-methylhydrogensiloxane copolymer, trimethylsilyl terminated methylhydrogenpolysiloxane, dimethylhydrogensilyl terminated methylhydrogenpolysiloxane, methylhydrogensiloxane-dimethylsiloxane cyclic copolymer, and organopolysiloxane composed of $(CH_3)_2HSiO_{\frac{1}{2}}$ units and $SiO_2$ units.

The blending ratio of component (b) must necessarily satisfy the condition that the molar ratio of total silicon-bonded hydrogen atoms in component (b) to total aliphatically unsaturated groups in the overall composition, including the alkenyl groups in component (a) and the alkynyl groups in component (d), is 0.75/1.00 to 1.05/1.00.

The platinum-type catalyst, component (c), cures the mixture of components (a) and (b) by an addition reaction and examples thereof are very finely divided platinum powder, very finely divided platinum powder adsorbed on a carbon powder support, chloroplatinic acid, alcohol-modified chloroplatinic acid, chloroplatinic acid-olefin complexes, chloroplatinic acid-vinylsiloxane coordination compounds, platinum black, palladium catalysts, and rhodium catalysts. The quantity of component (c) must give at least 20 ppm platinum-type metal based on the combined weights of components (a) and (b). When this quantity is less than 20 ppm, a large amount of hydrogen gas will be generated. Due to this, this quantity is preferably 25 to 200 ppm from a consideration of the economics and the generation of hydrogen gas.

Component (d) is important for regulating the rate of reaction in the composition of the present invention and for suppressing the generation of hydrogen gas. This component is a compound which possesses at least one alkynyl group per molecule; however, its chemical structure is not critical. In addition, this component may be a gas, liquid, or solid at room temperature, but must dissolve or disperse in component (a), (b), or (c), or the mixture of two or more of these components. Examples of this component are:

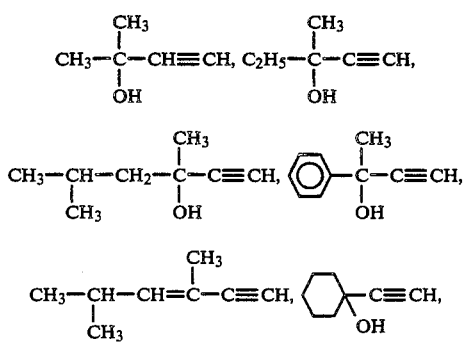

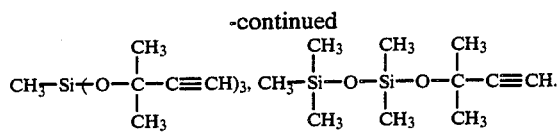, 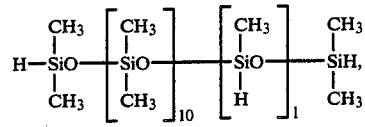

The quantity of component (d) must satisfy the condition that the weight ratio of total alkynyl groups in component (d) to platinum-type metal in component (c) is 1.0/1.0 to 15.0/1.0 and preferably 3.0/1.0 to 12.0/1.0.

The composition is produced by simply mixing the specified quantities of the above components (a) through (d) by known methods. It is then coated on the quartz optical communications fiber by any of various methods, e.g., coating the surface using a coating die, and then curing at elevated temperatures to give the cured coated fiber.

As necessary, various additives may be added to the composition if they do not interfere with properties of the coated fiber or the method of making it and these include silicas such a dry-method silica, wet-method silica, fine quartz powder, and diatomaceous earth; polysiloxane composed of

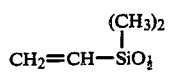

units and $SiO_2$ units; metal oxides such as titanium oxide, zinc oxide, and cerium oxide; oxides of the rare earth elements; mica; talc, and pigments.

The invention as claimed in the appended claims will be explained using demonstrational examples. In the examples, "parts" denote "weight parts" and "%" refers to "wt %." SiH represents a silicon-bonded hydrogen atom. The viscosity was measured at 25° C. The quantity of hydrogen gas produced is measured as follows: a cured rubber sheet (1 cm×5 cm×2 mm thick) is heated at 200° C. for 1 hour and the generated hydrogen gas is gas chromatographically determined and converted to the value at 25° C. and 1 atm.

The fiber's transmission characteristics are measured as follows. A graded index quartz fiber (core diameter, 50μ; fiber diameter, 125μ) manufactured by the MCVD method is coated with the composition to a thickness of 130μ and this is cured and then covered with Nylon-11 (260 μm thickness). The resulting optical fiber core is maintained at a temperature of 200° C. for 6 hours and the increase in loss at a wave length of 1.55μ is measured.

EXAMPLE 1

100 parts of a vinyl group-containing dimethylpolysiloxane (viscosity, 0.00045 m²/s) with the formula

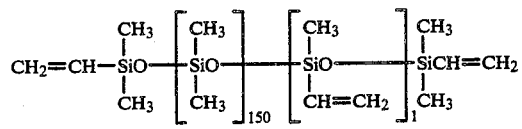

are thoroughly mixed with 8.1 parts methylhydrogenpolysiloxane (viscosity, 0.00002 m²/s) with the formula

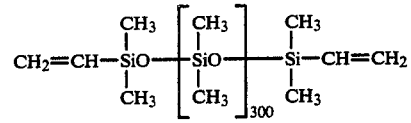

0.070 part of a mixture of chloroplatinate vinylsiloxanealcohol complex and dimethylpolysiloxane (4% platinum concentration, denoted below as platinum catalyst I) and 0.0090 part 3-methyl-1-butyne-3-ol. The resulting mixture is then maintained at a temperature of 150° C. for 10 minutes to obtain a rubber sheet. The molar ratio of total SiH to total aliphatically unsaturated groups in the composition is 0.98/1.00 and the platinum concentration is 26 ppm. The quantity of hydrogen gas generated by this sheet is 0.1 μL/g. The fiber coated with this composition exhibits an increase in transmission loss of 0.1 dB/km.

In the comparison examples, the same composition, but with a platinum concentration of 8 ppm, generated 2.5 μL/g hydrogen gas and has a 0.7 dB/km increase in transmission loss. The same composition, but containing 12.4 parts methylhydrogenpolysiloxane to give a molar ratio of total SiH groups to total aliphatically unsaturated groups of 1.5/1.0, generated 65 μL/g hydrogen gas and has an increase in transmission loss of equal to or greater than 10 dB/km.

EXAMPLE 2

100 parts vinyl group-containing dimethylpolysiloxane (viscosity, 0.002 m²/s) with the formula

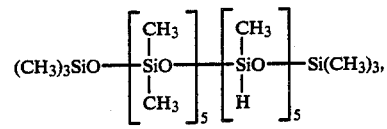

are thoroughly mixed with 1.60 parts methylhydrogenpolysiloxane (viscosity, 0.000015 m²/s) with the formula (CH₃)₃SiO—[SiO(CH₃)CH₃]₅—[SiO(CH₃)H]₅—Si(CH₃)₃, 0.076 part platinum catalyst I and 0.011 part organosilicon compound with the formula

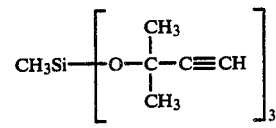

and the resulting mixture is then maintained at a temperature of 200° C. for 3 minutes to obtain a rubber sheet. The molar ratio of total SiH groups to total aliphatically unsaturated groups in this composition is 1/1 and the platinum concentration is 30 ppm. This sheet generated hydrogen gas at 0.2 μL/g and the fiber coated with this composition had an increase in transmission loss of 0.3 dB/km. In the comparison examples, the same composition, but in which the platinum concentration is 4 ppm, generated hydrogen gas at 3.2 μL/g and had an increase in transmission loss of 1.5 dB/km. The same composition, but containing 2.08 parts methylhydrogenpolysiloxane to give a molar ratio of total SiH groups to total aliphatically unsaturated groups of 1.3/1.0, generated hydrogen gas at 28 μL/g and had an increase in transmission loss of 8.5 dB/km.

EXAMPLE 3

100 parts vinyl group-containing dimethylpolysiloxane (viscosity, 0.001 m²/s) with the formula

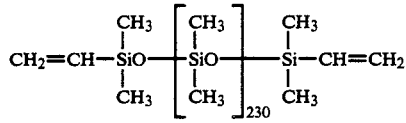

are thoroughly mixed with 10 parts polysiloxane (viscosity, 0.00015 m²/s) composed of

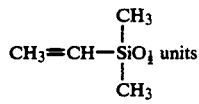

and $SiO_2$ units (3/1 molar ratio), 37.4 parts methylhydrogenpolysiloxane (viscosity, 0.00004 m²/s) with the formula

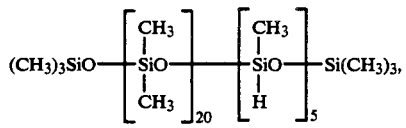

0.105 part platinum catalyst I and 0.030 part compound with the formula

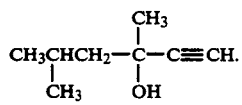

The resulting mixture is then maintained at a temperature of 120° C. for 60 minutes to obtain a rubber sheet. The molar ratio of total SiH groups to total aliphatically unsaturated groups in this composition is 0.95/1.00 and the platinum concentration is 28 ppm. This sheet generated hydrogen gas at 0.6 μL/g and the fiber coated with this composition had an increase in transmission loss of 1.2 dB/km. In the comparison examples, the same composition, but in which the platinum concentration is 12 ppm, generated hydrogen gas at 2.6 μL/g and exhibited an increase in transmission loss of 3.0 dB/km. The same composition, but containing 43.3 parts methylhydrogenpolysiloxane to give a molar ratio of total SiH groups to total aliphatically unsaturated groups of 1.1/1.0, generated hydrogen gas at 12 μL/g and exhibited an increase in transmission loss of 4.5 dB/km.

EXAMPLE 4

100 parts vinyl group-containing dimethylpolysiloxane (viscosity, 0.0065 m²/s) with the formula

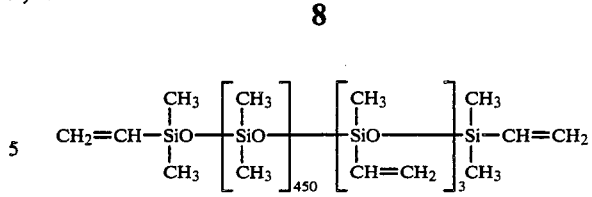

are thoroughly mixed with 7.76 parts methylhydrogenpolysiloxane (viscosity, 0.00002 m²/s) with the formula

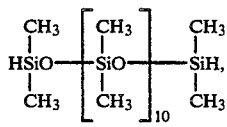

0.42 part of 5% 2-ethylhexanol solution of chloroplatinic acid, and 0.080 part 3-methyl-1-butyne-3-ol and the resulting mixture is then maintained at a temperature of 180° C. for 10 minutes to obtain a rubber sheet. The molar ratio of total SiH groups to total aliphatically unsaturated groups in this composition is 1.01/1.00 and the platinum concentration is 78 ppm. This sheet generated equal to or less than 0.01 μL/g hydrogen gas and the fiber coated with this composition exhibited an increase in transmission loss of equal to or less than 0.1 dB/km. In the comparison examples, the same composition, but containing 5 ppm platinum, generated hydrogen gas at 0.6 μL/g and had an increase in transmission loss of 0.2 dB/km. The same composition as above, but containing 8.45 parts methylhydrogenpolysiloxane to give a molar ratio of total SiH groups to total aliphatically unsaturated groups in the composition of 1.1/1.0 and with a platinum concentration of 5 ppm, generated hydrogen gas at 47 μL/g and had an increase in transmission loss of equal to or greater than 10 dB/km.

EXAMPLE 5

A composition is produced by the method described in Example 2, but using an allyl group-containing dimethylpolysiloxane produced by substituting allyl groups for the vinyl groups of the vinyl group-containing dimethylpolysiloxane employed in Example 2. The results are identical to the results for Example 2.

EFFECTS OF THE INVENTION

Unlike the methods in the prior art using the addition-curable silicone compositions of the prior art, the addition-curable silicone composition used in the method of the present invention hardly generates hydrogen gas during curing. Therefore, it can be advantageously employed as a coating composition for the primary coat, first coat and final coat of quartz optical communications fibers. In addition, quartz optical communications fibers coated with the cured product of this composition suffer from little transmission loss caused by hydrogen gas generated by the coating material and thus can be advantageously used as quartz optical communications fibers for public communications and long-distance communications.

That which is claimed is:

1. A method of suppressing hydrogen gas generation in making a coated quartz optical communications fiber comprising coating a quartz optical communications fiber with a composition consisting essentially of (a) organopolysiloxane with the average unit formula $$R_aSiO_{(4-a)/2}$$

in which R is a monovalent organic radical and at least 95 mol % of R in (a) are methyl radicals and a is a number with a value of 1.8 to 2.2, said organopolysiloxane having molecular terminals of the general formula $$-OSi(CH_3)_2\{(CH_2)_nCH=CH_2\}$$

in which n is 0 or 1, (b) methylhydrogenpolysiloxane which has at least two silicon-bonded hydrogen atoms per molecule and whose average unit formula is $$R_b{}^1SiO_{(4-b)/2}$$

in which $R^1$ is methyl radical or hydrogen atom and b is a number with a value of 1.5 to 3.0: (a) and (b) being present in sufficient amounts such that the molar ratio of the total moles of silicon-bonded hydrogen atoms in (b) to total moles of aliphatically unsaturated groups in the composition is from 0.75/1.00 to 1.05/1.00, (c) a platinum-type catalyst wherein at least 20 ppm platinum-type metal is present based on the combined quantities of (a) and (b), and (d) an alkynyl compound having at least one alkynyl group per molecule wherein the weight ratio of total alkynyl groups to platinum-type metal in the composition is 1.0/1.0 to 15.0/1.0, heating the resulting coated fiber curing the composition.

2. The method in accordance with claim 1 in which at least 97% of R are methyl, a is 1.95 to 2.05, the viscosity of (a) is from 0.0001 to 0.02 m²/s, the viscosity of (b) is from $1\times10^{-7}$ to 0.01 m²/s, (c) is a platinum catalyst and is present in an amount of from 25 to 200 ppm platinum metal based on the combined weight of (a) and (b) and the weight ratio of total alkynyl groups to platinum metal is from 3.0/1 to 12/1.

3. A coated quartz optical communications fiber obtained from the method of claim 1.

4. A coated quartz optical communications fiber obtained from the method of claim 2.

5. A method of suppressing hydrogen gas generation in quartz optical communications fiber consisting essentially of coating a quartz optical communications fiber with a composition consisting essentially of (a) organopolysiloxane with the average unit formula $$R_aSiO_{(4-a)/2}$$

in which R is a monovalent organic radical and at least 95 mol % of R in (a) are methyl radicals and a is a number with a value of 1.8 to 2.2, said organopolysiloxane having molecular terminals of the general formula $$-OSi(CH_3)_2\{(CH_2)_nCH=CH_2\}$$

in which n is 0 or 1, (b) methylhydrogenpolysiloxane which has at least two silicon-bonded hydrogen atoms per molecule and whose average unit formula is $$R_b{}^1SiO_{(4-b)/2}$$

in which $R^1$ is methyl radical or hydrogen atom and b is a number with a value of 1.5 to 3.0: (a) and (b) being present in sufficient amounts such that the molar ratio of the total moles of silicon-bonded hydrogen atoms in (b) to total moles of aliphatically unsaturated groups in the composition is from 0.75/1.00 to 1.05/1.00, (c) a platinum-type catalyst wherein at least 20 ppm platinum-type metal is present based on the combined quantities of (a) and (b), and (d) an alkynyl compound having at least one alkynyl group per molecule wherein the weight ratio of total alkynyl groups to platinum-type metal in the composition is 1.0/1.0 to 15.0/1.0, heating the resulting coated fiber curing the composition.

6. A method of suppressing hydrogen gas generation in quartz optical communications fiber consisting coating a quartz optical communications fiber with a composition consisting essentially of (a) organopolysiloxane with the average unit formula $$R_aSiO_{(4-a)/2}$$

in which R is a monovalent organic radical and at least 95 mol % of R in (a) are methyl radicals and a is a number with a value of 1.8 to 2.2, said organopolysiloxane having molecular terminals of the general formula $$-OSi(CH_3)_2\{(CH_2)_nCH=CH_2\}$$

in which n is 0 or 1, (b) methylhydrogenpolysiloxane which has at least two silicon-bonded hydrogen atoms per molecule and whose average unit formula is $$R_b{}^1SiO_{(4-b)/2}$$

in which $R^1$ is methyl radical or hydrogen atom and b is a number with a value of 1.5 to 3.0: (a) and (b) being present in sufficient amounts such that the molar ratio of the total moles of silicon-bonded hydrogen atoms in (b) to total moles of aliphatically unsaturated groups in the composition is from 0.75/1.00 to 1.05/1.00, (c) a platinum-type catalyst wherein at least 20 ppm platinum-type metal is present based on the combined quantities of (a) and (b), and (d) an alkynyl compound having at least one alkynyl group per molecule wherein the weight ratio of total alkynyl groups to platinum-type metal in the composition is 1.0/1.0 to 15.0/1.0, heating the resulting coated fiber curing the composition.

7. A communications fiber comprising a quartz communication fiber core having a primary coat, and optionally a first coat and a second coat in which the coats are a cured addition curable composition consisting essentially of in the uncured state (a) organopolysiloxane with the average unit formula $R_aSiO_{(4-a)/2}$ in which R is a monovalent organic radical and at least 95 mol % of R in (a) are methyl radicals and a is a number with a value of 1.8 to 2.2, said organopolysiloxane having molecular terminals of the general formula $-OSi(CH_3)_2\{(CH_2)_nCH=CH_2\}$ in which n is 0 or 1,
(b) methylhydrogenpolysiloxane which has at least two silicon-bonded hydrogen atoms per molecule and whose average unit formula is $R_b^1SiO_{(4-b)/2}$ in which $R^1$ is methyl radical or hydrogen atom and b is a number with a value of 1.5 to 3.0: (a) and (b) being present in sufficient amounts such that the molar ratio of the total moles of silicon-bonded hydrogen atoms in (b) to total moles of aliphatically unsaturated groups in the composition is from 0.75/1.00 to 1.05/1.00,
(c) a platinum-type catalyst wherein at least 20 ppm platinum-type metal is present based on the combined quantities of (a) and (b), and
(d) an alkynyl compound having at least one alkynyl group per molecule wherein the weight ratio of total alkynyl groups to platinum-type metal in the composition is 1.0/1.0 to 15.0/1.0.

8. The communications fiber according to claim 7 in which the cured addition curable composition is the primary coat and the first coat and second coat are not present.

9. The communications fiber according to claim 7 in which there is a primary coat and a first coat and both are the cured addition curable composition.

10. The communication fiber according to claim 7 in which there is a primary coat, a first coat, and a second coat and these coats are the cured addition curable composition.

* * * * *